…

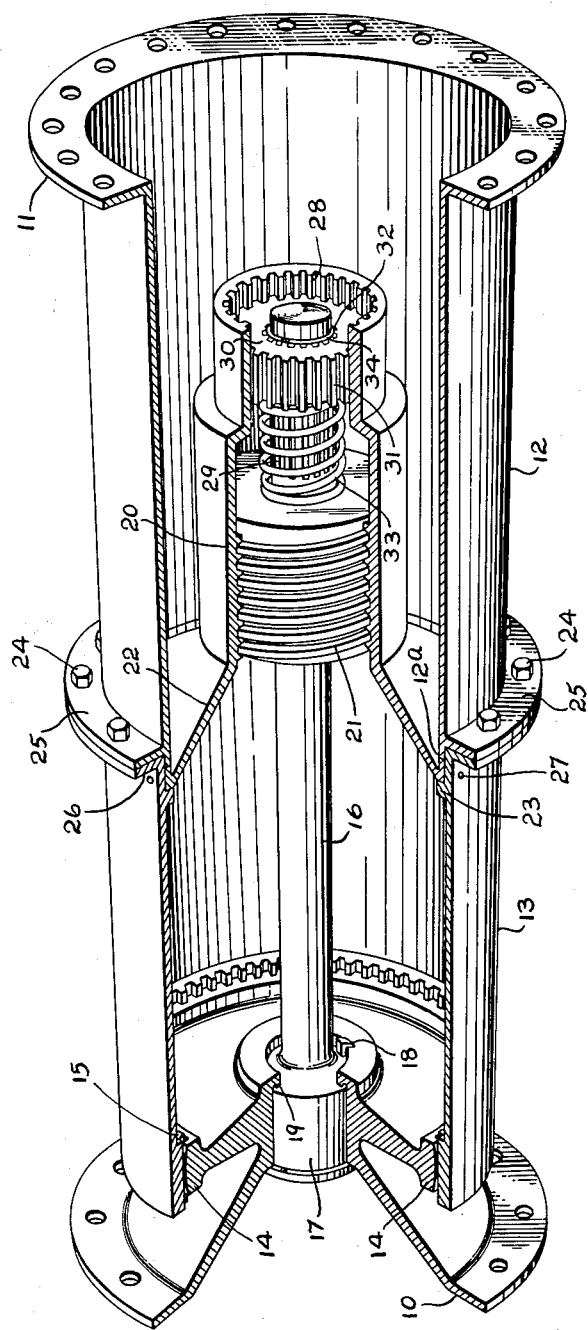

United States Patent Office 2,749,726
Patented June 12, 1956

2,749,726
TORQUE TRANSMITTING COUPLING

Armour Lloyd McCullough, North York Township, Ontario, Canada, assignor to A. V. Roe Canada Limited, Malton, Ontario, Canada, a corporation Application March 8, 1954, Serial No. 414,776

6 Claims. (Cl. 64—9)

This invention relates to a torque transmitting coupling for adjustably spaceable coaxial elements. Although the invention has been developed in connection with gas turbine engines and is described as applied to such engines, it will be apparent that its application is not so limited.

In gas turbine engines the compressor shaft is coupled to the turbine shaft, and such coupling of necessity must be adjustable so as to vary within fine limits the spacing between the compressor and the turbine. This variation of spacing is necessary in order to compensate for a build-up in tolerances, since there is usually one location along the shaft length which is fixed as the datum. When a gas turbine engine is assembled, the compressor rotor is located with respect to the center bearing, leaving the turbine rotor to be adjusted axially to obtain correct clearances.

The means hitherto utilized to effect correct location and spacing of the turbine rotor in relation to its stator blade ring or rings are cumbersome and necessitate careful fitting of the shaft. In most instances the tubular shaft on which the rotor of the turbine and of the compressor are mounted has to be constructed in specially splined sections which allow axial movement so that the turbine rotor section of it may be slid out of engagement from the compressor section. Adjustment is then made by placing specially prepared shims at the head of a tension member which holds the two shaft sections in fixed axial relationship. As will be apparent to those skilled in the art, the steps described are time consuming and they are not ideal for quantity production, as it is necessary to prepare special shims for each engine, the thicknesses of which can only be determined on actual assembly.

It is therefore the main object of the invention to provide a torque transmitting coupling for adjustably spaceable coaxial elements, such as the turbine rotor and the tension rod adjacent its said other end; the sleeve therefore is secured to the tension rod. The sleeve 20 also is provided with an annular flange 22 the periphery of which is held against axial movement relative to the hollow shaft since it is gripped between the end 12a of the shaft section 12 and an internal ring 23 provided on the abutting end of the shaft section 13. After final assembly the two shaft sections are secured together by nut and bolt assemblies 24 passing through abutting external flanges 25 and 26 of the shaft sections. The annular flange 22 of the sleeve 20 together with the end 12a and the ring 23 of the two shaft sections, constitute co-operating components of the shaft and the sleeve which are conditionable to one condition where the shaft and the sleeve are locked against rotation and to another condition where they are rotatable relative to each other; for greater security in locking these parts against relative rotation, pins 27 may be driven through the shaft 13 and the annular flange 22 after final assembly.

Adjacent the end of the sleeve 20 are provided internal splines 28 and adjacent the free end of the tension rod 16 are provided external splines 29; it will be observed that the splines 29 are considerably longer than the splines 28. Slidably mounted on the tension rod 16 within the sleeve 20 is a ring 30 having external splines 31 and internal splines 32 which respectively are complementary to the internal splines 28 of the sleeve and the external splines 29 of the tension rod. The ring 30 is axially slidable on the tension rod, but normally it is urged into the position illustrated by a helical spring 33 which forces the ring into engagement with a snap ring 34, which snap ring limits the outward movement of the ring 30.

Adjustment of the apparatus is effected as follows: After the nut and bolt assemblies 24 have been loosened, an externally splined wrench (not shown) having a central bore is inserted through the turbine end of the hollow shaft 12 and it engages the splines 28 of the sleeve 20; the bore of the wrench must be large enough to clear the splines 29 of the tension rod 16. By applying a sufficient axial force to the wrench, the ring 30 overcomes the inherent force of the helical compressor rotor of a gas turbine engine, which can easily be adjusted to effect the proper spacing between the two elements in an efficient and simple manner and which overcomes the above described difficulties.

The foregoing and still further objects and advantages of the invention will become apparent from a study of the following description, taken in conjunction with the accompanying drawing, which illustrates a broken-away perspective view of a torque transmitting shaft assembly and coupling connecting the compressor and the turbine of a typical gas turbine engine, and in which the invention is incorporated.

At opposite ends of the shaft assembly illustrated in the drawing is a hub 10 adapted to be connected to the compressor (not shown) of the engine and a hub 11 adapted to be connected to the turbine (not shown) of the engine. Secured to the hub 11 is a hollow shaft consisting of sections 12 and 13. In order to transmit torque between the hollow shaft and the hub 10, an appropriate flexible coupling is provided, such as a gear 14 on the hub 10 and which meshes with a ring gear 15 at the outer extremity of the hollow shaft. By this flexible coupling torque is transmitted from the hollow shaft 12, 13 to the hub 10, although relative axial movement of the shaft and of the hub is possible and allowance is made for small angular misalignment.

In order to adjust the spacing between the two hubs and to hold them after adjustment in a fixed axial relationship there is provided a tension rod 16 having one end 17 securely gripped in the bore of the hub 10 by suitable means, such as a key and keyway assembly 18 and abutting shoulders 19 and having its other end extending within the hollow shaft. Encompassing the other end of the tension rod is an internally threaded sleeve 20 having internal screw threads which are complementary to externaal screw threads 21 provided on the spring 33 and eventually it will slide on the tension rod to such an extent that the splines 31 of the ring will disengage the splines 28 of the sleeve.

If the wrench then is rotated, the sleeve rotates, thus moving the tension rod 16 axially relative to the hollow shaft in one sense or in the other, depending on the sense in which the wrench is rotated, and consequently varies the spacing between the turbine hub 11 and the compressor hub 10; the "play" of course is taken up by the sliding movement of the gear 14 relative to the ring gear 15. When the wrench is removed, the splines 31 of the ring 30 once again engage the splines 28 of the sleeve 20 and thus the sleeve cannot rotate relative to the tension rod 16. Finally, the nut and bolt assemblies 24 are tightened, pins 27 are driven, and the sleeve 20 becomes locked relative to the hollow shafts 12, 13.

It is to be understood that the form of the invention herewith shown and described is to be taken as a preferred example of the same and that various changes may be made without departing from the spirit of the invention or the scope of the subjoined claims.

What I claim as my invention is:

1. A torque transmitting coupling for adjustably spaceable coaxial elements, comprising a hollow shaft fast on one element, means transmitting torque between the shaft and the other element whilst permitting relative axial movement of the shaft and the said other element, a tension rod extending from the said other element into the shaft, tension rod securing means axially fixed in the shaft, another tension rod securing means axially fixed to the other element, the tension rod and one of the securing means being axially fixed relative to each other, complementary screw threads on the tension rod and on the other securing means, the tension rod and the threaded securing means being rotatable relative to each other and consequently relative rotation of the tension rod and of the threaded securing means causing axial movement of the tension rod relative to the threaded securing means and hence of the elements relative to each other, longitudinal splines on the tension rod adjacent one end of the tension rod, an internally splined sleeve spaced from and encompassing the splined end of the tension rod, the said sleeve being fast on the securing means which is adjacent the splined end of the tension rod, and an axially slidable ring having internal splines complementary to the splines on the tension rod and external splines complementary to the splines on the sleeve, the ring when positioned in the space between the sleeve and the rod for mutual engagement of the two pairs of complementary splines locking the tension rod against rotation relative to the threaded securing means, and releasable means holding the ring so positioned.

2. A torque transmitting coupling for adjustably spaceable coaxial elements, comprising a hollow shaft fast on one element, means transmitting torque between the shaft and the other element whilst permitting relative axial movement of the shaft and the said other element, a tension rod extending from the said other element into the shaft, tension rod securing means axially fixed in the shaft, another tension rod securing means axially fixed to the other element, the tension rod and one of the securing means being axially fixed relative to each other, complementary screw threads on the tension rod and on the other securing means, one end of the tension rod projecting beyond the adjacent securing means and being provided with a series of longitudinal splines, the tension rod and the threaded securing means being rotatable relative to each other and consequently relative rotation of the tension rod and of the threaded securing means causing axial movement of the tension rod relative to the threaded securing means and hence of the elements relative to each other, a sleeve coaxial with the tension rod and secured to the aforesaid adjacent securing means and having a series of internal splines, the said sleeve being spaced from and encompassing the projecting end of the tension rod, the splines of one series being longer than the splines of the other series, the splines of the shorter series facing portions of the splines of the longer series and the remaining portions of the splines of the longer series extending beyond the splines of the shorter series, a ring having internal and external splines complementary to the splines on the tension rod and on the sleeve, respectively, the said ring being axially slidably mounted on the rod within the sleeve and being axially slidable to one position at which it engages only the splines of the longer series and to another position at which it engages both the splines of the longer series and the splines of the shorter series to lock the tension rod against rotation relative to the sleeve, and releasable means holding the ring in the said other position.

3. A torque transmitting coupling for adjustably spaceable coaxial elements, comprising a hollow shaft fast on one element, means transmitting torque between the shaft and the other element whilst permitting relative axial movement of the shaft and the said other element, a tension rod extending from the said other element into the shaft, tension rod securing means axially fixed in the shaft, another tension rod securing means axially fixed to the other element, the tension rod and one of the securing means being axially fixed relative to each other, complementary screw threads on the tension rod and on the other securing means, one end of the tension rod projecting beyond the adjacent securing means and being provided with a series of longitudinal splines, the tension rod and the threaded securing means being rotatable relative to each other, relative rotation of the tension rod and of the threaded securing means causing axial movement of the tension rod relative to the threaded securing means and hence of the elements relative to each other, a sleeve coaxial with the tension rod and secured to the aforesaid adjacent securing means and having a series of internal splines, the said sleeve being spaced from and encompassing the projecting end of the tension rod, the splines of one series being longer than the splines of the other series, the splines of the shorter series facing portions of the splines of the longer series and the remaining portions of the splines of the longer series extending beyond the splines of the shorter series, a ring having internal and external splines complementary to the splines on the tension rod and on the sleeve, respectively, the said ring being axially slidably mounted on the rod within the sleeve and being slidable to one position at which it engages only the splines of the longer series and to another position at which it engages both the splines of the longer series and the splines of the shorter series to lock the tension rod against rotation relative to the sleeve, biasing means bearing against one side of the ring to urge it to said other position, and cooperating means of the shaft and of the ring to limit movement of the ring by the biasing means.

4. A torque transmitting coupling for adjustably spaceable coaxial elements, comprising a hollow shaft fast on one element, means transmitting torque between the shaft and the other element whilst permitting relative axial movement of the shaft and the said other element, a tension rod having one end securely held by the said other element and its other end projecting within the shaft, screw threads on the tension rod adjacent its said other end, a sleeve coaxially mounted for rotation within the shaft and encompassing the threaded portion of the tension rod, cooperating components of the shaft and of the sleeve holding the sleeve against axial movement relative to the shaft and conditionable to one condition where the shaft and the sleeve are locked against relative rotation and to another condition where they are rotatable relative to each other, internal screw threads in the sleeve complementary to and registering with the screw threads on the tension rod, rotation of the sleeve relative to the tension rod when the cooperating components are conditioned to the said other condition causing axial movement of the tension rod relative to the sleeve and hence of the elements relative to each other, longitudinal splines on the tension rod intermediate the end of the tension rod which is within the shaft and the threads adjacent the said end, longitudinal splines within the sleeve and opposite the tension rod splines, a ring having internal splines complementary to the splines on the tension rod and external splines complementary to the splines on the sleeve, the ring locking the tension rod against rotation relative to the sleeve when the ring is positioned in the space between the sleeve and the tension rod for mutual engagement of the pairs of complementary splines, and releasable means holding the ring so positioned.

5. A torque transmitting coupling for adjustably spaceable coaxial elements, comprising a hollow shaft fast on one element, means transmitting torque between the shaft and the other element whilst permitting relative axial movement of the shaft and the said other element, a tension rod having one end securely held by the said other element and its other end projecting within the shaft, screw threads on the tension rod adjacent its said other end, a sleeve coaxially mounted for rotation within the shaft and encompassing the threaded portion of the tension rod, cooperating components of the shaft and of the sleeve holding the sleeve against axial movement relative to the shaft and conditionable to one condition where the shaft and the sleeve are locked against relative rotation and to another condition where they are rotatable relative to each other, internal screw threads in the sleeve complementary to and registering with the screw threads on the tension rod, rotation of the sleeve relative to the tension rod when the cooperating components are conditioned to the said other condition causing axial movement of the tension rod relative to the sleeve and hence of the elements relative to each other, a series of longitudinal splines on the tension rod intermediate the end of the tension rod which is within the shaft and the threads adjacent the said end, a series of longitudinal splines within the sleeve, the splines of one series being longer than the splines of the other series, the splines of the shorter series facing portions of the splines of the longer series and the remaining portions of the splines of the longer series extending beyond the splines of the shorter series, a ring having internal and external splines complementary to the splines on the tension rod and on the sleeve, respectively, the said ring being axially slidably mounted on the rod within the sleeve and being axially slidable to one position at which it engages only the splines of the longer series and to another position at which it engages both the splines of the longer series and the splines of the shorter series to lock the tension rod against rotation relative to the sleeve, and releasable means holding the ring in the said other position.

6. A torque transmitting coupling for adjustably space-able coaxial elements, comprising a hollow shaft fast on one element, means transmitting torque between the shaft and the other element whilst permitting relative axial movement of the shaft and the said other element, a tension rod having one end securely held by the said other element and its other end projecting within the shaft, screw threads on the tension rod adjacent its said other end, a sleeve coaxially mounted for rotation within the shaft and encompassing the threaded portion of the tension rod, cooperating components of the shaft and of the sleeve holding the sleeve against axial movement relative to the shaft and conditionable to one condition where the shaft and the sleeve are locked against relative rotation and to another condition where they are rotatable relative to each other, internal screw threads in the sleeve complementary to and registering with the screw threads on the tension rod, rotation of the sleeve relative to the tension rod when the cooperating components are conditioned to the said other condition causing axial movement of the tension rod relative to the sleeve and hence of the elements relative to each other, a series of longitudinal splines on the tension rod intermediate the end of the tension rod which is within the shaft and the threads adjacent the said end, a series of longitudinal splines within the sleeve, the splines of one series being longer than the splines of the other series, the splines of the shorter series facing portions of the splines of the longer series and the remaining portions of the splines of the longer series extending beyond the splines of the shorter series, a ring having internal and external splines complementary to the splines on the tension rod and on the sleeve, respectively, the said ring being axially slidably mounted on the rod within the sleeve and being axially slidable to one position at which it engages only the splines of the longer series and to another position at which, it engages both the splines of the longer series and the splines of the shorter series to lock the tension rod against rotation relative to the sleeve, biasing means bearing against one side of the ring to urge it to said other position, and a stop fast on the shaft and engaging with the other side of the ring to limit movement of the ring by the biasing means.

References Cited in the file of this patent
UNITED STATES PATENTS
2,550,580    McLeod et al.           Apr. 24, 1951